April 19, 1938.                C. W. KNEFF                2,114,926
                                PIN CUTTER
                           Filed July 7, 1936            2 Sheets-Sheet 1
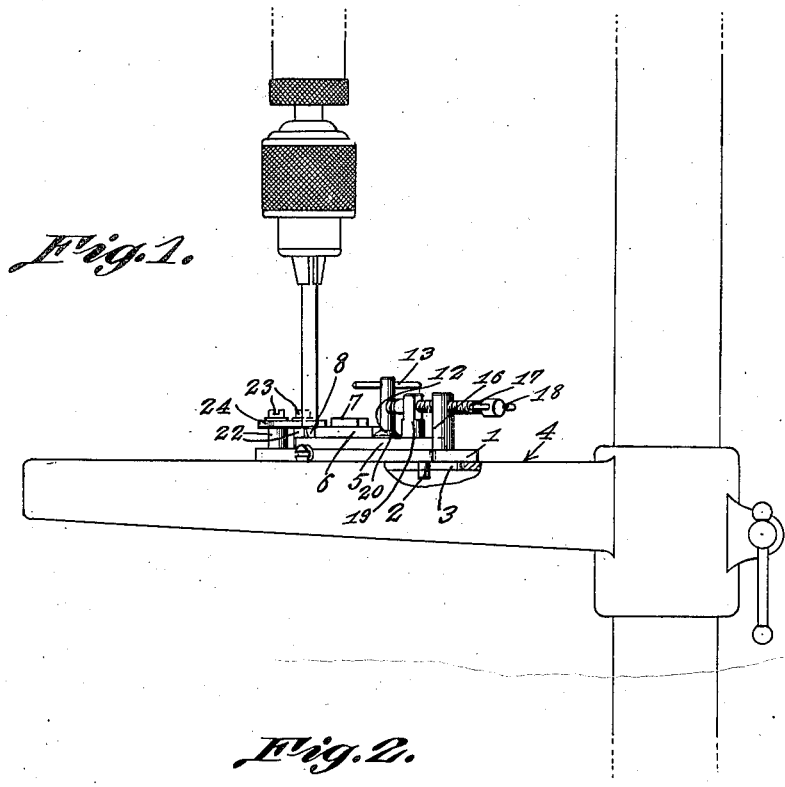
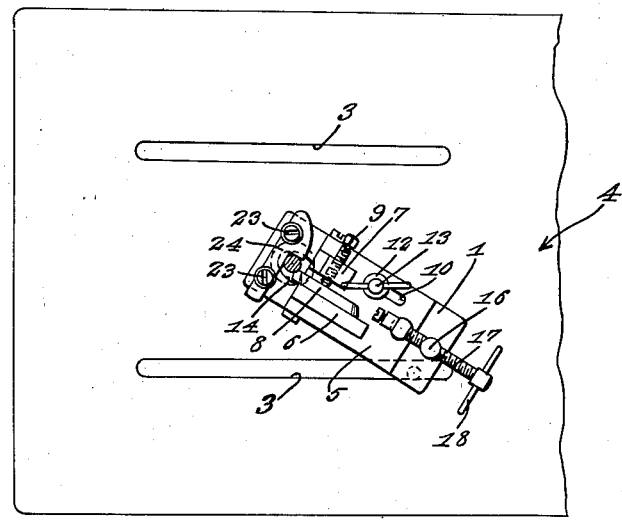
Clinton W. Kneff, INVENTOR
BY Victor J. Evans & Co.
ATTORNEYS April 19, 1938.                C. W. KNEFF                2,114,926
                                PIN CUTTER
                            Filed July 7, 1936           2 Sheets-Sheet 2
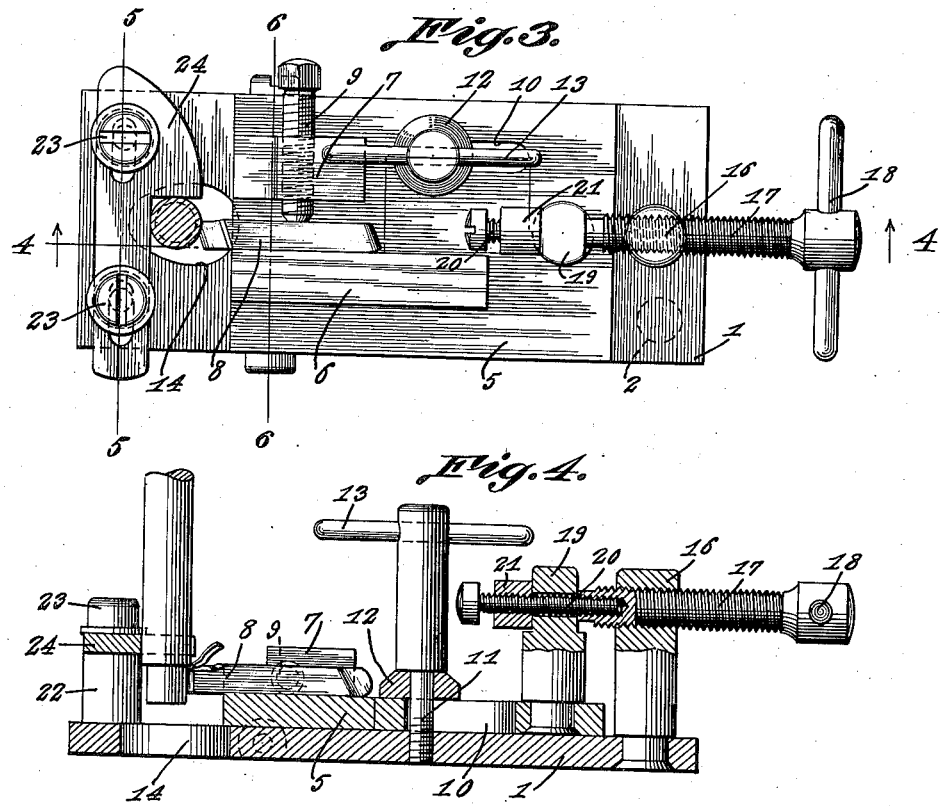
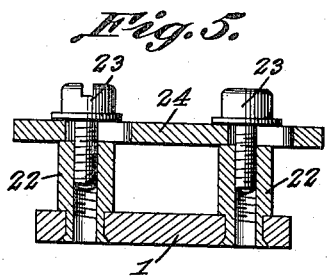
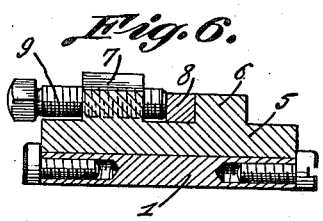
Clinton W. Kneff, INVENTOR
BY Victor J. Evans & Co.
ATTORNEYS Patented Apr. 19, 1938

2,114,926

UNITED STATES PATENT OFFICE 2,114,926

PIN CUTTER

Clinton W. Kneff, Bridgeville, Pa.

Application July 7, 1936, Serial No. 89,451

1 Claim. (Cl. 82—1)

This invention relates to pin cutters, and has for the primary object the provision of a simple and inexpensive device of this character which may be readily adjusted to cut stock to desired diameters by the rotation of the stock relative to the cutter of said device and the latter may be readily employed on a table of a drill press or similar machine.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a pin cutter constructed in accordance with my invention and showing the same applied to a drill press.

Figure 2 is a fragmentary top plan view illustrating the same.

Figure 3 is a top plan view illustrating the pin cutter.

Figure 4 is a sectional view taken on the line 4—4 of Figure 3.

Figure 5 is a transverse sectional view taken on the line 5—5 of Figure 3.

Figure 6 is a transverse sectional view taken on the line 6—6 of Figure 3.

Referring in detail to the drawings, the numeral 1 indicates a base having a pin 2 to fit in a slot 3 of a table of a drill press, indicated generally by the character 4, and Fig. 1 of the drawings shows the relationship of the rotary chuck of the drill press with respect to the table and cutting device. Slidably mounted on the base is a carriage 5 including spaced blocks or shoulders 6 and 7, one of which acts as a rest for a cutter element 8. The shoulder 7 has a set bolt 9 threaded therethrough which may be adjusted in engagement with the cutter element for retaining the latter in adjusted position.

A slot 10 is provided in the carriage through which extends a securing rod or member 11 equipped with a shoulder 12 and a hand piece 13. The member 11 is threaded into the base and by rotating the same in one direction the shoulder 12 will be caused to bear tightly against the carriage for securing the latter in adjusted positions. The base is provided adjacent one end with a work-receiving opening 14 and the carriage 5 is adjusted towards and from the opening 14 and the cutter element operates thereover. A post 16 is secured to the base and has threaded therethrough a feed stem 17 provided with a handle 18. A post 19 is secured to the carriage and extending therethrough is a stud bolt 20 having threaded engagement with the feed stem, one end of which bears against one side of the post 19. A nut 21 is threaded on the stud bolt and bears against the post 19 at an opposite side thereof from the face engaged by the feed stem 17. By adjusting the feed stem the carriage can be moved towards and from the work opening 14.

The base 1 is equipped with internally threaded sleeves 22 arranged adjacent the work opening 14 and threaded in said sleeves are stud bolts 23. A work guide 24 is adjustably secured to the sleeves by the stud bolts and is adjustable relative to the work opening and also the cutter and is adapted to be engaged by the work during the time that the work is operated on by the cutter. It is understood that the work is rotated when in engagement with the guide and relative to the cutter so that the work will be shaved or cut to a diameter desired.

Having described the invention, I claim:

A pin cutter comprising an elongated flat base having a work receiving opening adjacent one end thereof, a flat plate-like carriage positioned on the base for movement towards and from the work receiving opening and having a slot, an anchoring member extending through the slot and threaded in said base and including a shouldered portion to bear on said carriage whereby the latter may be secured in any of its adjusted positions on the base and relative to said work receiving opening, spaced parallel blocks secured on said carriage and extending from the end of the latter which is adjacent said work receiving opening, a cutter mounted on the carriage between said blocks, a set bolt threaded in one of said blocks and bearing against the cutter to force the latter against the other block, a guard mounted on said base for adjustment relative to said work receiving opening and the cutter, posts secured on the base and carriage and arranged in alignment with each other and with the cutter and with said work receiving opening, a feed stem threaded in one of said posts, and means carried by the other post and secured to said feed stem whereby the rotation of the latter in opposite directions will bring about adjustment of the carriage towards and from the work receiving opening.

CLINTON W. KNEFF.